(12) United States Patent
Yim et al.

(10) Patent No.: US 7,804,889 B2
(45) Date of Patent: Sep. 28, 2010

(54) CHANNEL ESTIMATION METHOD AND APPARATUS USING LINEAR INTERPOLATION SCHEME IN ORTHOGONAL FREQUENCY DIVISION MULTIPLEXING SYSTEM AND RECEIVER USING THE SAME

(75) Inventors: Eun-Jeong Yim, Seongnam-si (KR); Hee-Jin Roh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 876 days.

(21) Appl. No.: 11/706,071

(22) Filed: Feb. 14, 2007

(65) Prior Publication Data
US 2007/0230601 A1 Oct. 4, 2007

(30) Foreign Application Priority Data
Feb. 14, 2006 (KR) ...................... 10-2006-0014254

(51) Int. Cl.
*H04B 3/46* (2006.01)
*H04B 17/00* (2006.01)
*H04Q 1/20* (2006.01)

(52) U.S. Cl. ........................ 375/224; 375/342; 370/500

(58) Field of Classification Search ................. 375/224, 375/227, 285, 316, 340, 342; 370/206, 491, 370/500
See application file for complete search history.

(56) References Cited

U.S. PATENT DOCUMENTS 6,381,229 B1 4/2002 Narvinger et al.
6,907,026 B2 6/2005 Akiyama
7,209,433 B2 * 4/2007 Scarpa ....................... 370/206
7,471,728 B2 * 12/2008 Brutel et al. ................. 375/260
7,474,611 B2 * 1/2009 Svensson et al. ............ 370/208
7,558,223 B2 * 7/2009 Shirakata et al. ............ 370/280
7,636,366 B2 * 12/2009 Terabe ........................ 370/401
7,647,073 B2 * 1/2010 Sung et al. ............... 455/562.1
7,660,229 B2 * 2/2010 Papasakellariou et al. ... 370/203
2004/0184399 A1 9/2004 Chiou
2005/0265490 A1 12/2005 Sestok, IV et al.
2006/0269016 A1 * 11/2006 Long et al. .................. 375/340

FOREIGN PATENT DOCUMENTS

| RU | 2222372 | 4/2004 |
|---|---|---|
| WO | WO 03/034644 | 4/2003 |
| WO | WO 2004/017537 | 2/2004 |

\* cited by examiner

*Primary Examiner*—Jean B Corrielus
(74) *Attorney, Agent, or Firm*—The Farrell Law Firm, LLP

(57) ABSTRACT

Disclosed are a channel estimation method and a channel estimation apparatus, and a receiver using the same. The channel estimation apparatus provided in the receiver detects pilot signals from radio signals and estimates channels of the detected pilot signals. The channel estimation apparatus estimates channels corresponding to data by conducting linear interpolation, which allows for simultaneous interpolation in time and frequency axes, by use of information on the estimated pilot channels. Thus, the memory capacity required for the receiver can be reduced using channel estimation in which the simultaneous interpolation is conducted. Also, the performance of the receiver can be further improved in a wireless environment where the receiver moves at high speed.

18 Claims, 12 Drawing Sheets

Lattice-type pilot arrangement

CHANNEL ESTIMATION METHOD AND APPARATUS USING LINEAR INTERPOLATION SCHEME IN ORTHOGONAL FREQUENCY DIVISION MULTIPLEXING SYSTEM AND RECEIVER USING THE SAME

PRIORITY

This application claims the benefit under 35 U.S.C. §119(a) of an application entitled "Channel Estimation Method and Apparatus Using Linear Interpolation Scheme in Orthogonal Frequency Division Multiplexing System and Receiver Using the Same" filed in the Korean Industrial Property Office on Feb. 14, 2006 and assigned Serial No. 2006-014254, the contents of which are incorporated herein by reference.

BACKGROUND OF THE INVENTION

1. Field of the Invention

The present invention relates to a channel estimation method and a channel estimation apparatus in a wireless communication system using a multicarrier, and more particularly to a channel estimation method and a channel estimation apparatus in an Orthogonal Frequency Division Multiplexing (OFDM) system, and a receiver using the same.

2. Description of the Related Art

Nowadays, with the development of communication industry and an increasing user demand for a packet data service, a need for a communication system capable of efficiently providing a high-speed packet data service is increasing. Since the existing communication networks have been developed mainly for the purpose of a voice service, they have a drawback in that their data transmission bandwidths are relatively small and their usage fees are expensive. In order to solve this drawback, research has been rapidly undertaken for use of an OFDM scheme which is a wireless access scheme to provide expanded bandwidth.

The OFDM scheme is a multicarrier transmission scheme in which a serial input symbol stream is converted into parallel signals. Converted parallel signals are modulated with multiple orthogonal subcarriers and the modulated signals are transmitted. The OFDM scheme has widely been exploited for digital transmission technologies requiring high-speed transmission, such as broadband wireless Internet technology, Digital Audio Broadcasting (DAB) technology, Wireless Local Area Network (WLAN) technology and so forth.

Estimation of a channel over which a radio signal is transmitted in an OFDM system includes a pilot signal-based estimation method, a method using data decoded in a decision directed scheme, and a method using a blind detection scheme for estimating a channel without known data. In general, supposing coherent demodulation is used in a wireless communication system, a transmitting end transmits pilot signals for channel estimation, and a receiving end for performing the coherent demodulation estimates a channel based on the received pilot signals.

Reference will now be made to how to arrange pilot signals in a transmission frame of a conventional OFDM system, with reference to FIGS. 1A to 1C. In a conventional OFDM system, a pilot arrangement scheme may be classified into a block-type pilot arrangement scheme, a comb-type pilot arrangement scheme and a lattice-type pilot arrangement scheme, according to whether pilot signals are arranged along the frequency axis, the time axis or both. FIG. 1A illustrates the block-type pilot arrangement scheme, FIG. 1B illustrates the comb-type pilot arrangement scheme, and FIG. 1C illustrates the lattice-type pilot arrangement scheme.

In FIGS. 1A to 1C, the abscissa represents time, the ordinate represents frequency, and each shaded portion P1 represents a pilot signal.

In the block-type pilot arrangement scheme illustrated in FIG. 1A, pilot signals are arranged at specific OFDM symbols along the time axis, respectively, and are arranged at all subcarriers of the OFDM symbols when viewed along the frequency axis. This scheme requires conducting interpolation in the time axis in order to estimate channels affecting data signals. In the comb-type pilot arrangement scheme illustrated in FIG. 1B, pilot signals are uniformly distributed over respective OFDM symbols, and are arranged at the same subcarrier at each time interval. This scheme requires conducting interpolation in the frequency axis in order to estimate channels affecting data signals. In the lattice-type pilot arrangement scheme illustrated in FIG. 1C, pilot signals are regularly arranged along both the time and frequency axes. This scheme requires conducting interpolation in both the time and frequency axes in order to estimate channels that are suitable for a variable channel environment and affect data signals.

Hereinafter, a description is provided of how to perform channel estimation for e.g. a DVB-H frame when pilot signals are arranged according to fixed rules on both the time and frequency axes. In the DVB-H frame illustrated in FIG. 2, pilot signals are arranged using a combination of the comb-type pilot arrangement scheme and the lattice-type pilot arrangement scheme. This combination scheme requires conducting interpolation in both the time and frequency axes in order to estimate a channel that is suitable for a variable channel environment and affects data signals.

With regard to this, when a pilot spacing in the time axis is compared with that in the frequency axis, a conventional interpolation technique begins with in the axis where a pilot spacing is narrower. That is, interpolation is conducted first in the axis where a pilot spacing is narrower, and then is conducted in the axis where a pilot spacing is wider. Since known channel information occurs when interpolation is conducted in the axis where a pilot spacing is wider, an interpolation interval is reduced as compared with the pilot spacing. In other words, when interpolation is conducted first in the axis where a pilot spacing is narrower, channel information for some data portions is acquired through the interpolation. This channel information may correspond to the same data positions when viewed in the axis where a pilot spacing is wider, and thus pilot portions and some data portions become known at the moment when interpolation is conducted in the axis where a pilot spacing is wider. Thus, an actual interpolation interval is reduced as compared with a pilot spacing.

FIG. 3 illustrates the sequence of interpolation operations for channel estimation in a conventional OFDM system. If it is assumed that the OFDM system is a DVB-H system having the frame structure illustrated in FIG. 2, a pilot spacing in the time axis is 4 symbols, as indicated by reference numeral "301", and a pilot spacing in the frequency axis is 12 symbols, as indicated by reference numeral "303". Accordingly, the interpolation designated by arrow number ① is conducted first in the time axis, and then interpolation designated by arrow number ② is conducted in the frequency axis. Thus, in order to conduct interpolations ① and ②, at least pilot information for interpolation in the time axis must be provided. Further, since interpolation in the frequency axis is conducted using result values from interpolation in the time axis, the result values must also be stored in a memory. Thus, in order to conduct the interpolation described in regard to FIG. 3, a memory capacity of, for example, (5×the number of pilot positions×data format) is required. Here, the pilot position includes not only the pilot position of one OFDM symbol, but all the positions of scattered pilots which are cyclically repeated.

More specially, in the above-mentioned memory capacity of five times the number of pilot positions multiplied by the data formats, numeral "5" denotes channel information for 2 pilot portions, which are consecutive when pilot signals are repeated every 4 symbols in the time axis, and channels of 3 data portions, which are acquired by interpolation using the channel information for 2 pilot portions. The number of pilot positions denotes the number of pilot positions including all the pilot positions of four OFDM symbols corresponding to a four cycle repetition, and the data format denotes the number of bits required for representing one channel information.

In the interpolation technique described above, since data of OFDM symbols corresponding to a pilot spacing must be stored, a high memory capacity is required for conducting interpolation in the axis where a pilot spacing is narrower. That is, in FIG. 3, a pilot spacing of 4 symbols in the time axis is relatively small, but a memory capacity capable of storing at least 5 symbols is required.

Further, the conventional interpolation technique is limited in regard to ensuring performance in a wireless environment where a terminal moves at high speed. That is, the performance of the terminal deteriorates because an interpolation interval in the time axis is fixed, despite the increased change of fading in the time axis as the speed at which the receiver moves increases. Further, for example, the frame structure in FIG. 2 requires pilot information for a spacing of at least 4 OFDM symbols in order to conduct interpolation in the time axis, and must use pilot information for at least 8 OFDM symbols in order to create known channel values at regular positions in the frequency axis. Thus, the number of OFDM symbols affecting interpolation in the frequency axis is 8 or more, which is not narrow in comparison with a coherent time as the transmission speed goes higher and higher.

Accordingly, the channel estimation method in a conventional OFDM system has a problem in that the performance of a receiver deteriorates because an interpolation interval in the time axis is fixed, and a high memory capacity is required for conducting interpolation in the frequency axis. Consequently, there is a need for a solution to this problem.

SUMMARY OF THE INVENTION

Accordingly, the present invention has been made to solve the above-mentioned problems occurring in conventional systems, and an aspect of the present invention is to provide a channel estimation method and a channel estimation apparatus using a linear interpolation scheme in an OFDM system, and a receiver using the same.

A further aspect of the present invention is to provide a channel estimation method and a channel estimation apparatus suitable for a wireless environment, in which a receiver moves at high speed, in an OFDM system, and the receiver using the same.

A further aspect of the present invention is to provide a channel estimation method and a channel estimation apparatus capable of minimizing the memory capacity required for a receiver in an OFDM system, and the receiver using the same.

In accordance with the above aspects of the present invention, there is provided a channel estimation method in a receiver of an OFDM system, the channel estimation method including receiving and storing symbols, and estimating channels of pilot allocation subcarriers carrying pilot symbols, that is, pilot channels, when the pilot symbols are received; when two pilot channels are estimated at a first pilot allocation subcarrier in a channel estimation metric, searching for a pilot channel that is estimated within a time interval, at which two pilots carried by the first pilot allocation subcarrier have been transmitted, from among pilot channels estimated from a second pilot allocation subcarrier adjacent to the first pilot allocation channel; and estimating channels carrying data symbols included in an triangle which is formed by the three estimated pilot channels in the channel estimation metric.

In accordance with another aspect of the present invention, there is provided a channel estimation method in a receiver of an OFDM system, the channel estimation method including receiving and storing symbols, and estimating channels of pilot allocation subcarriers carrying pilot symbols, that is, pilot channels, when the pilot symbols are received; at a point of time when one pilot carried by a pilot allocation subcarrier is received and a pilot channel of the pilot allocation subcarrier is estimated, searching for pilot channels of two other pilots, which are connected with the one pilot to form a minimum triangle in a channel estimation metric, from among pilots previously carried by other pilot allocation subcarriers; and estimating channels carrying data symbols included in the triangle which is formed by the three estimated pilot channels in the channel estimation metric.

In accordance with yet another aspect of the present invention, there is provided a channel estimation apparatus provided in a receiver of an OFDM system, the channel estimation apparatus including a pilot channel estimator for receiving and storing symbols, and estimating channels of pilot allocation subcarriers carrying pilot symbols, that is, pilot channels, when the pilot symbols are received; and a linear interpolator which, when two pilot channels are estimated at a first pilot allocation subcarrier in a channel estimation metric, searches for a pilot channel that is estimated within a time interval, at which two pilots carried by the first pilot allocation subcarrier have been transmitted, from among pilot channels estimated from a second pilot allocation subcarrier adjacent to the first pilot allocation channel, and estimates channels carrying data symbols included in an triangle which is formed by the three estimated pilot channels in the channel estimation metric.

In accordance with still yet another aspect of the present invention, there is provided a channel estimation apparatus provided in a receiver of an OFDM system, the channel estimation apparatus including a pilot channel estimator for receiving and storing symbols, and estimating channels of pilot allocation subcarriers carrying pilot symbols, that is, pilot channels, when the pilot symbols are received; and a linear interpolator which, at a point of time when one pilot carried by a pilot allocation subcarrier is received and a pilot channel of the pilot allocation subcarrier is estimated, searches for pilot channels of two other pilots, which are connected with the one pilot to form a minimum triangle in a channel estimation metric, from among pilots previously carried by other pilot allocation subcarriers, and estimates channels carrying data symbols included in the triangle which is formed by the three estimated pilot channels in the channel estimation metric.

In accordance with still yet another aspect of the present invention, there is provided a receiver apparatus of an OFDM system, the receiver apparatus including an RF end for receiving and processing radio signals; a fast Fourier transformer for converting the radio signals into frequency-domain signals; a pilot channel estimator for estimating channels of pilot allocation subcarriers carrying pilots, that is, pilot channels, when the pilots are detected from the radio signals; a linear interpolator which, when two pilot channels are estimated at a first pilot allocation subcarrier in a channel estimation metric, searches for a pilot channel that is estimated within a time interval, at which two pilots carried by the first pilot allocation subcarrier have been transmitted, from among pilot channels estimated from a second pilot allocation subcarrier adjacent to the first pilot allocation channel, and estimates channels carrying data symbols included in an triangle which is formed by the three estimated pilot channels in the channel estimation metric; a channel compensator for compensating for signals of the estimated channels by using channel information output from the linear interpolator; and a decoder for decoding received signals of the estimated channels into original signals.

In accordance with still yet another aspect of the present invention, there is provided a receiver apparatus of an OFDM system, the receiver apparatus including an RF end for receiving and processing radio signals; a fast Fourier transformer for converting the radio signals into frequency-domain signals; a pilot channel estimator for estimating channels of pilot allocation subcarriers carrying pilots, that is, pilot channels, when the pilots are detected from the radio signals; a linear interpolator which, at a point of time when one pilot carried by a pilot allocation subcarrier is received and a pilot channel of the pilot allocation subcarrier is estimated, searches for pilot channels of two other pilots, which are connected with the one pilot to form a minimum triangle in a channel estimation metric, from among pilots previously carried by other pilot allocation subcarriers, and estimates channels carrying data symbols included in the triangle which is formed by the three estimated pilot channels in the channel estimation metric; a channel compensator for compensating for signals of the estimated channels by using channel information output form the linear interpolator; and a decoder for decoding received signals of the estimated channels into original signals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
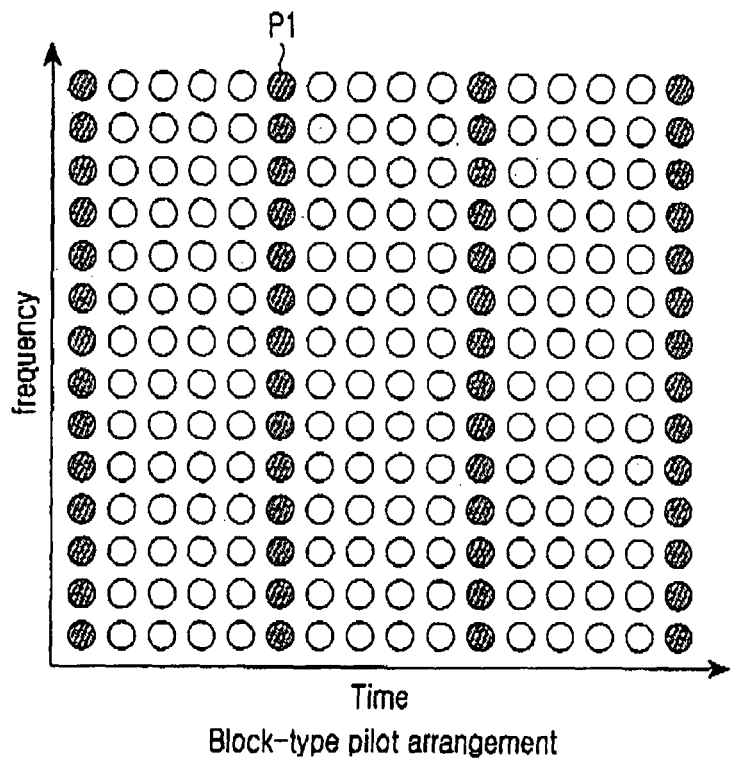
FIGS. 1A to 1C illustrate how to arrange pilot signals in a transmission frame of an OFDM system.
Figure 1B:
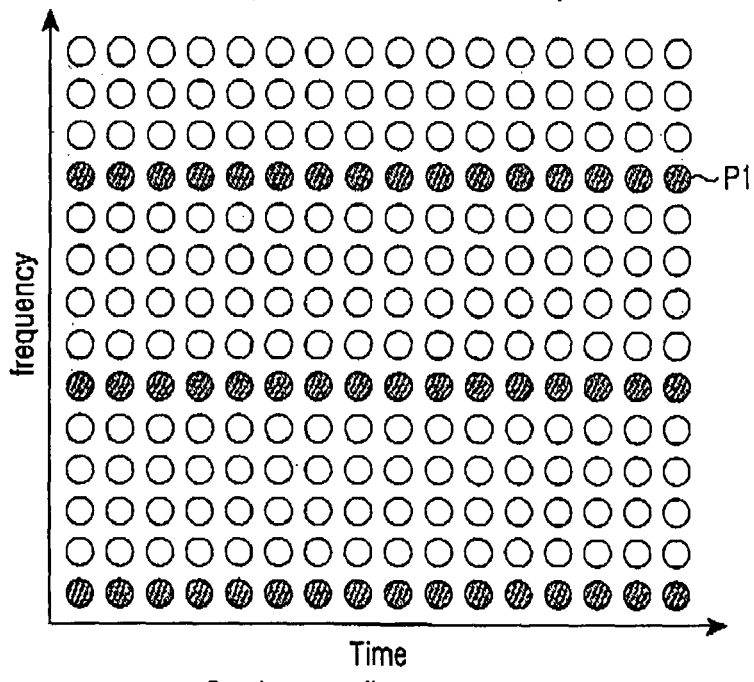
Figure 1C:
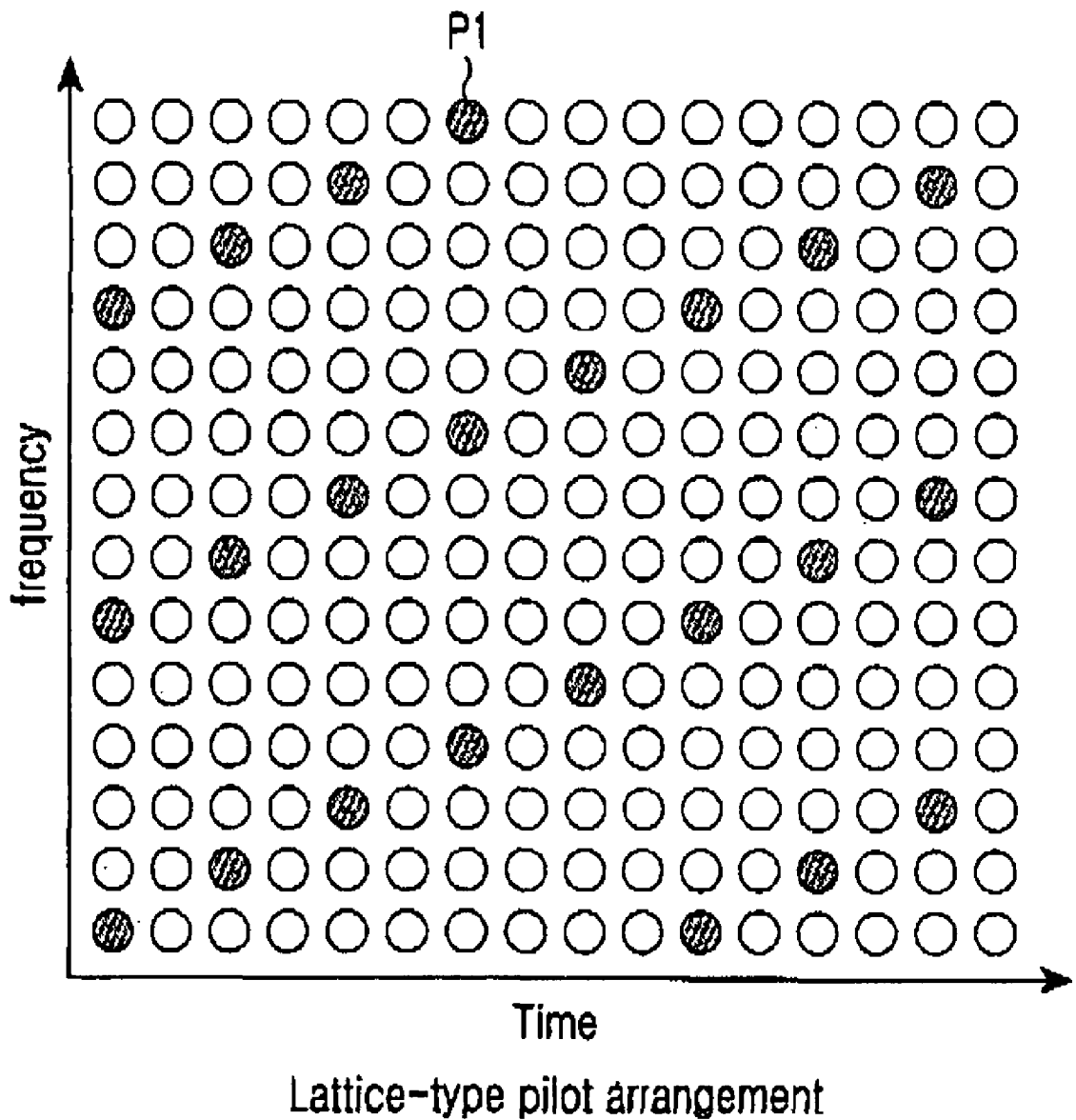

Hereinafter, preferred embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted so as not to make the subject matter of the present invention rather unclear.

Figure 4:
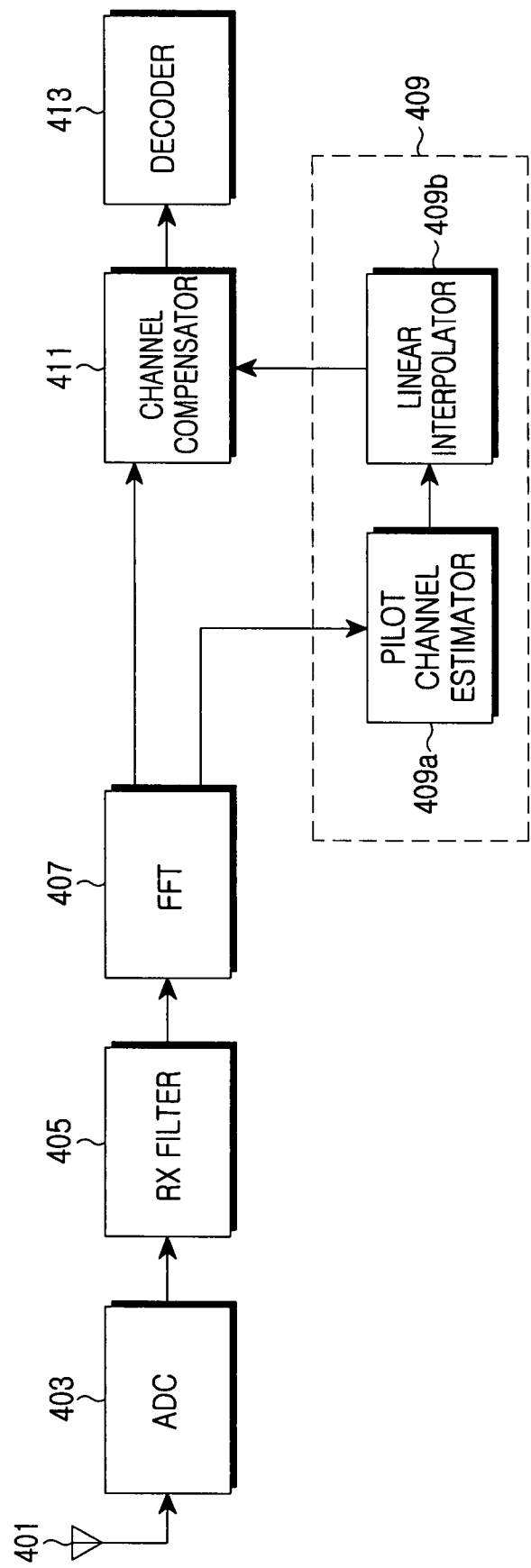
FIG. 4 is a block diagram illustrating the structure of a receiver which conducts linear interpolation for channel estimation in an OFDM system in accordance with the present invention.

FIG. 4 is a block diagram illustrating the structure of a receiver which conducts linear interpolation for channel estimation in an OFDM system according to the present invention. The OFDM receiver in FIG. 4 includes known elements such as an Analog-to-Digital Converter (ADC) 403 for converting analog signals received through an antenna 401 into digital signals, a receive (Rx) filter 405 for extracting and filtering only signals of a service band from the received signals, and a Fast Fourier Transformer (FFT) 407 for converting the time-domain received signals into frequency-domain signals.

The receiver in FIG. 4 further includes a pilot channel estimator 409a for estimating channels (i.e., pilot channels) of pilot signals from among the converted received signals, a linear interpolator 409b for conducting linear interpolation, as described below (and referred to as diagonal interpolation), which allows for simultaneous interpolation in the time and frequency axes, using information on the estimated pilot channels to estimate channels of data signals according to the present invention, a channel compensator 411 for compensating for signals of the estimated channels using interpolation information output from the linear interpolator 409b, and a decoder 413 for decoding the received signals of the compensated channels into original signals. Here, the pilot channel estimator 409a and the linear interpolator 409b constitute a channel estimator 409 according to the present invention, and the linear interpolator 409b is provided with a memory (not shown) for estimated channel values and incremental values required for estimating next channel values.

Figure 5:
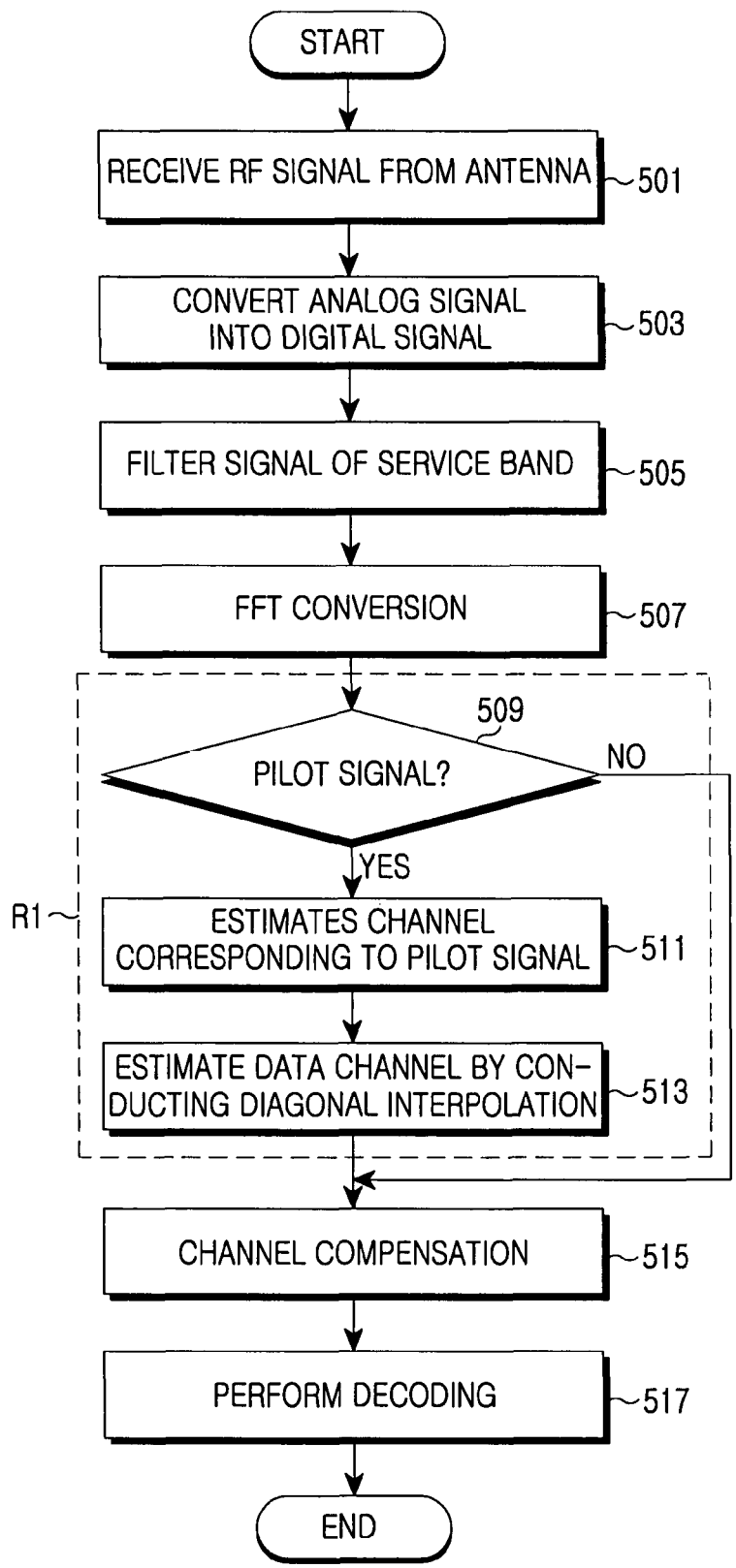
FIG. 5 is a flowchart illustrating a channel estimation method in an OFDM system in accordance with the present invention.

FIG. 5 is a flowchart illustrating a channel estimation method in an OFDM system according to the present invention. In FIG. 5, operations included in the block designated by reference numeral "R1" are performed in the channel estimator 409 of FIG. 4.

First, in Step 501, the receiver receives radio signals through the antenna 401, and transfers the radio signals to the ADC 403. In Step 503, the ADC quantizes the received analog signals into digital signals, and outputs the digital signals to the Rx filter 405. In Step 505, the Rx filter 405 filters signals of a predetermined service band from the received signals, and outputs the filtered signals. In Step 507, the FFT 407 performs a demodulation operation for converting the time-domain signals, output from the Rx filter 405, into frequency-domain signals. In Step 509, the pilot channel estimator 409a determines whether pilot signals are detected from among signals output from the FFT 407. When the pilot channel estimator 409a detects pilot signals, it estimates pilot channels in Step 511. In Step 513, the linear interpolator 409b conducts diagonal interpolation according to the present invention, which allows for simultaneous interpolation in the time and frequency axes, using information on the estimated pilot channels, thereby estimating channels of data signals.

In Step 515, the channel compensator 411 compensates for channels of the received signals using the estimated channels. Finally, in Step 517, the decoder 413 decodes the received signals, the channels of which have been compensated, into original signals. If in Step 509, pilot signals are not detected from among the signals output from the FFT 407, the operations in Steps 511 and 513 are omitted, and the channel estimation method goes to Step 515 to perform only the channel compensation operation.

Reference will now be made in detail to a linear interpolation method conducted by the channel estimator 409 according to the present invention, with reference to FIGS. 6 to 10.

Figure 6:
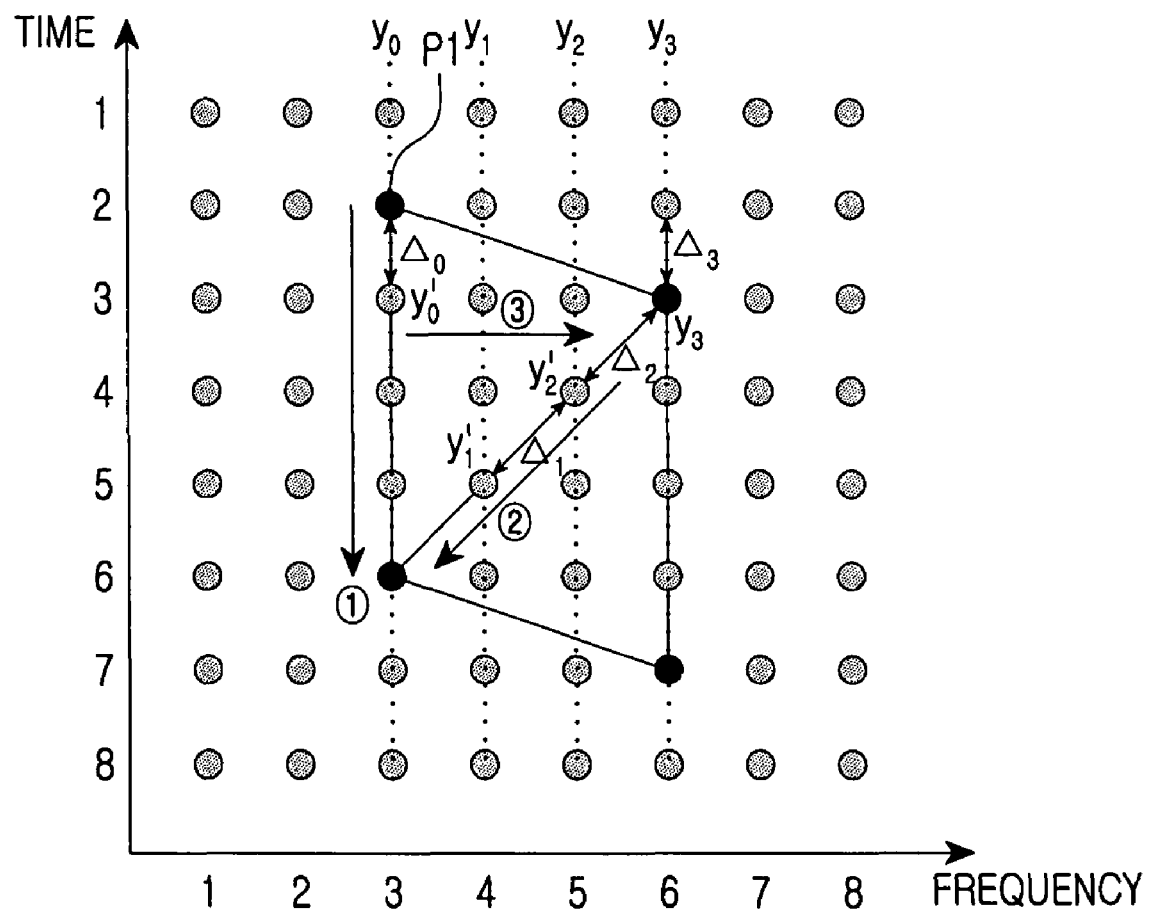
FIG. 6 is a view illustrating a linear interpolation method in accordance with an embodiment of the present invention.
Figure 7:
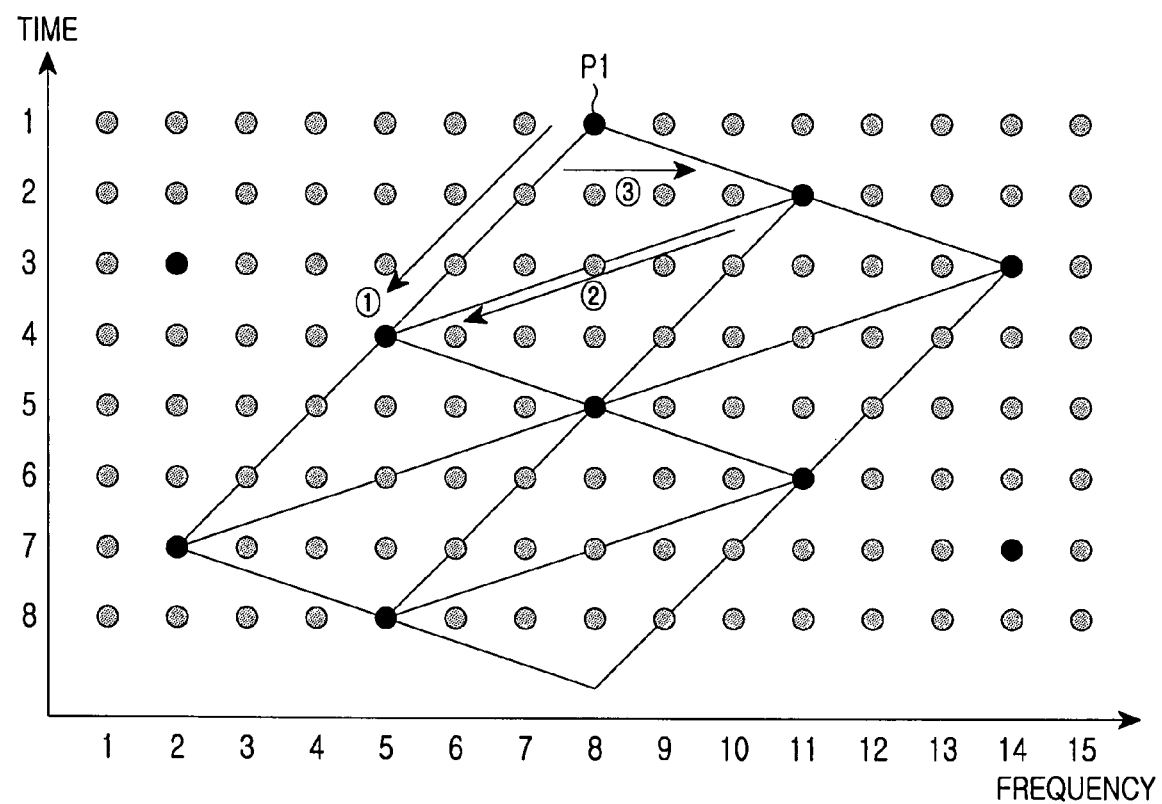
FIG. 7 is a view illustrating a linear interpolation method in accordance with another embodiment of the present invention.

Here, a channel estimation metric as illustrated in FIGS. 6 and 7 is utilized to describe the channel estimation method. The channel estimation metric is in the form of an orthogonal coordinate system, with time slots of symbol transmission shown on the ordinate, and with the abscissa showing subcarrier frequency. Time indexes for identifying the respective slots are indicated on the ordinate of the channel estimation metric, and frequency indexes for identifying the respective subcarriers are indicated on the abscissa of the channel estimation metric. On the channel estimation metric, pilots are allocated every two or more subcarriers among consecutive subcarriers along the abscissa. In FIGS. 6 and 7, pilots are allocated every three subcarriers, and each of such subcarriers to which pilots are allocated will be called a pilot allocation subcarrier. Further, as used herein, a scheme for arranging pilots over the pilot allocation subcarriers takes a lattice-type pilot arrangement scheme in which pilots shift by one or more slots along the time axis between two adjacent pilot allocation subcarriers. FIG. 6 illustrates a linear interpolation method according to an embodiment of the present invention in which black-colored circles P1 denote pilot signals. Operations in FIG. 6 are conducted by the linear interpolator 409b. The interpolation scheme illustrated in FIG. 6 is characterized in that interpolation in the time axis, interpolation in the frequency axis, and diagonal interpolation allowing for simultaneous interpolation in the time and frequency axes are conducted in channel estimation. In FIG. 6, reference numerals "①", "②" and "③" designate the sequence of interpolation operations, and it again doesn't matter if ① and ② are transposed.

Referring to FIG. 6, two pilots are sequentially received at intervals of 4 symbols over a pilot allocation subcarrier having frequency index of 3. At a point of time when the second pilot is received, the channel estimator 409 searches for a pilot carried by a pilot allocation subcarrier next to the pilot allocation subcarrier corresponding to frequency index 3, from among pilots received within a time interval at which the two received pilots have been received, in order to rapidly estimate channels of already received data symbols. That is, referring to FIG. 6, a pilot having index (6, 3) (which means index (frequency axis, time axis)) is searched. Then, as illustrated in FIG. 6, a triangle is formed by connecting the pilot symbols selected on the channel estimation metric, that is, pilot symbols having indexes (3, 6), (3, 2) and (6, 3). In other words, the present invention proposes a method of estimating channels by rapidly interpolating data included in the triangle.

First of all, channels of data existing on connecting lines which connect the three pilots on the channel estimation metric are estimated by linearly interpolating channel estimation information of the three pilots. In FIG. 6, since there is no data symbol on the connecting line which connects the pilots corresponding indexes (3, 2) and (6, 3), interpolation ① for estimating channels of data symbols existing on the connecting line, which connects the pilots corresponding to indexes (3, 2) and (3, 6), and interpolation ② for estimating channels of data symbols existing on the connecting line, which connects the pilots corresponding to indexes (3, 6) and (6, 3), are conducted. If estimated channel values of the data symbols, that is, estimated data channel values, are obtained through interpolation ① and interpolation ②, a channel value of each data symbol inside of the triangle can be estimated through frequency-axis interpolation using the estimated data channel values, which is designated by reference numeral "③" in FIG. 6.

FIG. 7 illustrates a linear interpolation method according to another embodiment of the present invention, in which black-colored circles P1 denote pilot signals. Operations in FIG. 7 are conducted by the linear interpolator 409b. The interpolation scheme illustrated in FIG. 7 is characterized in that interpolation in the frequency axis and diagonal interpolation allowing for simultaneous interpolation in the time and frequency axes are conducted in channel estimation. In FIG. 7, reference numerals "①", "②" and "③" designate the sequence of interpolation operations. Notably, it doesn't matter if ① and ② are transposed.

Referring to FIG. 7, at a point of time when a pilot corresponding to index (5, 4) on the channel estimation metric is received, the channel estimator 409 operates as follows. The channel estimator 409 searches for channel estimation information of two pilots which are connected with the pilot having index (5, 4) to form a triangle of minimum area. from among other pilots previously carried by pilot allocation subcarriers different than the pilot allocation subcarrier corresponding to a frequency index of 5. That is, pilots corresponding to indexes (8, 1) and (11, 2) in FIG. 7 are searched. Then, as illustrated in FIG. 7, a triangle is formed by connecting the three pilots selected on the channel estimation metric. First of all, channels of data existing on connecting lines which connect the three pilots on the channel estimation metric are estimated by linear interpolating channel estimation information of the three pilots. In FIG. 7, since there is no data symbol on the connecting line which connects the pilots corresponding to indexes (8, 1) and (11, 2), interpolation ① for estimating channels of data symbols existing on the connecting line, which connects the pilots corresponding to indexes (5, 4) and (8, 1), and interpolation (2 for estimating channel of data symbols existing on the connecting line, which connects the pilots corresponding to indexes (5, 4) and (11, 2), are conducted. If estimated channel values of the data symbols, that is, estimated data channel values, are obtained through interpolation ① and interpolation ②, a channel value of each data symbol inside of the triangle can be estimated through frequency-axis interpolation using the estimated data channel values, which is designated by reference numeral "③" in FIG. 7. Channel estimation for the remaining triangles illustrated in FIG. 7 is also conducted in a similar manner. Meanwhile, in order to implement a linear interpolator conducting interpolation operations as in FIGS. 6 and 7, the linear interpolator may be provided with a memory for storing calculated channel values and a memory for incremental values required to calculating next channel values, as illustrated in FIG. 8.

Figure 8:
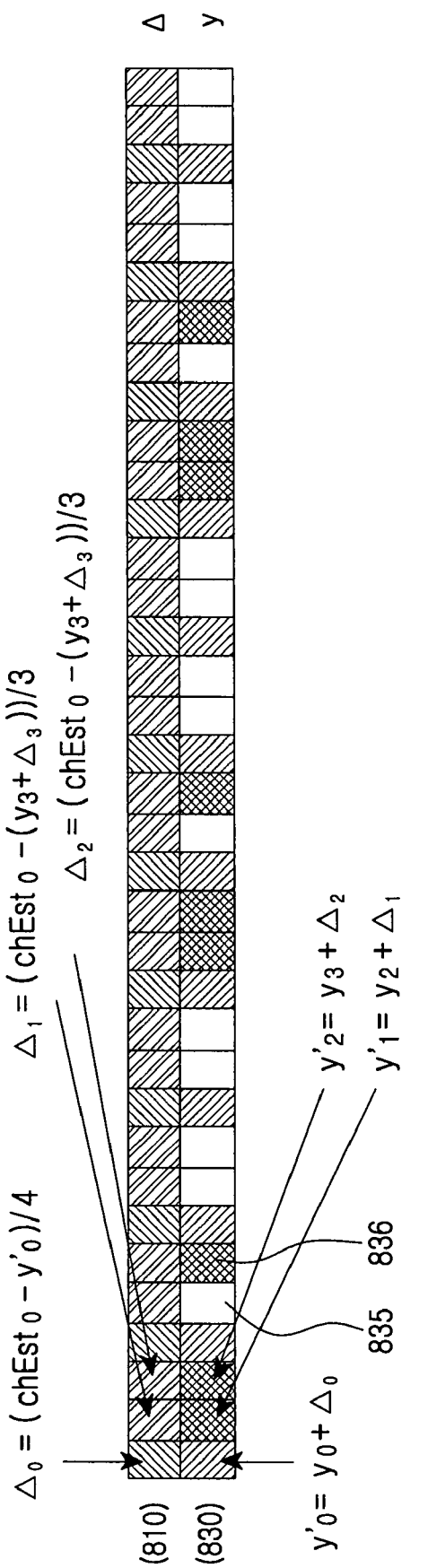
FIG. 8 is a view illustrating the structure of a memory provided in a linear interpolator in accordance with the present invention.

FIG. 8 illustrates the structure of a memory provided in a linear interpolator according to an embodiment of the present invention, and the memory structure in FIG. 8 corresponds to an example of applying the linear interpolation method in FIG. 6.

In FIG. 8, a memory storing calculated (estimated) channel values will be called a y memory 830, and the memory storing incremental values for calculation (estimation) is called a Δ memory 810.

A channel estimation procedure using the memories 810, 830 illustrated in FIG. 8 may be summarized as given by items (1) to (4) below. In item (2), y prime (y') denotes present updated information.

(1) Channels of subcarriers carrying pilot signals are estimated.

(2) Calculated channel values are updated into the y memory 830 according to the following Equations (1-a) through (1-c):

$$y_0' = y_0 + \Delta_0, \text{ (stored in positions corresponding to multiples of 3)} \quad (1\text{-a})$$

$$y_1' = y_2 + \Delta_1, \text{ (stored in positions corresponding to a remainder of 1 when divided by 3)} \quad (1\text{-b})$$

$$y_2' = y_3 + \Delta_2, \text{ (stored in positions corresponding to a remainder of 2 when divided by 3)} \quad (1\text{-c})$$

In Equations (1-a) through (1-c), $\Delta_0$, $\Delta_1$ and $\Delta_2$ denote incremental values, $y_0'$, $y_1'$ and $y_2'$ of present updated channel information, and $y_0$, $y_1$, $y_2$ and $y_3$ denote previously stored channel information, all of which are represented in FIG. 6. Here, the positions corresponding to multiples of 3 means the positions of subcarriers, to which indexes corresponding to multiples of 3 are attached, from among subcarriers 0 to N−1. That is, in FIG. 6, an estimated channel value of the subcarrier corresponding to index 3 is stored in memory position $y_0$, an estimated channel value of the subcarrier corresponding to index 4 is stored in memory position $y_1$, and an estimated channel value of the subcarrier corresponding to index 5 is stored in memory position $y_2$. At the next point of time, information stored in $y_0'$, $y_1'$ and $y_2'$ become previous information $y_0$, $y_1$ and $y_2$ and are used for calculating next channel values in Equations (1-a) through (1-c).

Equation (1-a) updates channel values of symbols carried by the subcarrier corresponding to index 3, according to interpolation ① in FIG. 6. $\Delta_0$ represents incremental values of data symbols between the pilot symbols corresponding to indexes (3, 2) and (3, 6), and all incremental values between the data symbols are identical. Channel values according to interpolation of data symbols corresponding to indexes (3, 3), (3, 4) and (3, 5) are sequentially updated into memory position $y_0$ where the pilot symbol corresponding to index (3, 2) is presently stored. For example, when $y_0$ is updated with the channel value of the data symbol corresponding to index (3, 4), the channel value of the data symbol corresponding to index (3, 3), which has been previous $y_0'$, now becomes $y_0$, and the channel value of the data symbol corresponding to index (3, 4), which is calculated by Equation (1-a), is updated into the memory.

Figure 2:
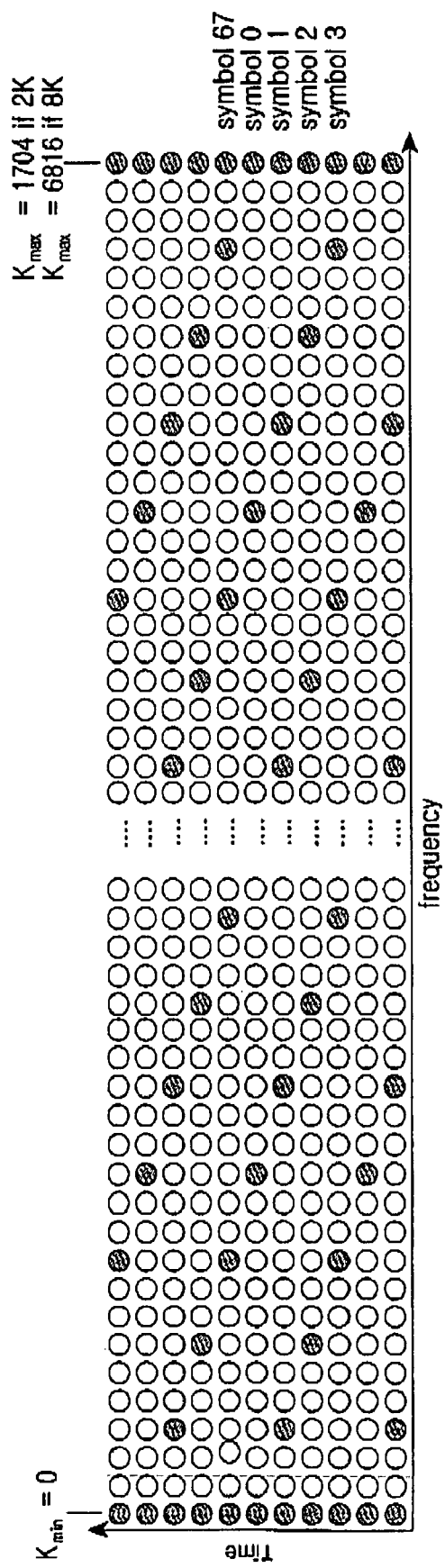
FIG. 2 illustrates a pilot arrangement scheme in a common DVB-H frame.
Figure 3:
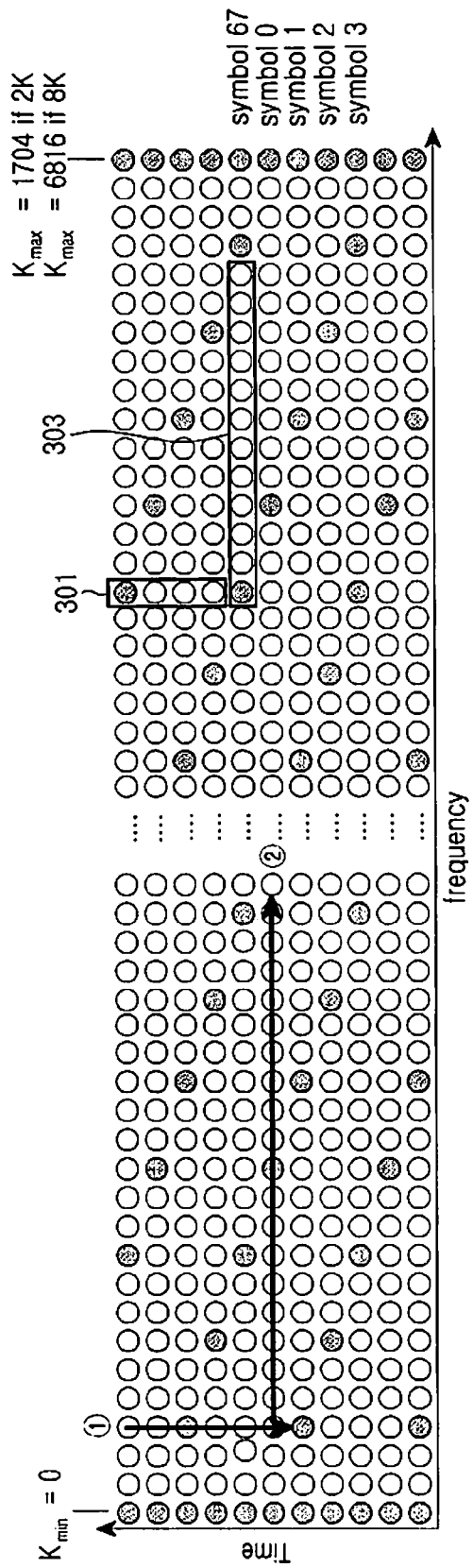
FIG. 3 illustrates the sequence of interpolation operations for channel estimation in a conventional OFDM system.

Equations (1-b) and (1-c) update data channel values interpolated on the connecting line between the pilot symbols corresponding to indexes (3, 6) and (6, 3), according to interpolation ② in FIG. 6. Thus, a data channel value of the subcarrier corresponding to frequency index 5 is updated first by Equation (1-c), and then a data channel value of memory position $y_1$ for storing a channel value of the subcarrier corresponding to frequency index 4 is updated by Equation (1-b). As a result of this, at a point of time illustrated in FIG. 8, memory position 836 is filled, and memory position 835 is empty and will be filled later. Variable $y_3$ included in Equation (1-c) is a variable for inputting a channel value of the subcarrier corresponding to index 6, and may be changed to $y_0$ when data on another triangle, which is formed using two pilots carried by the subcarrier of index 6, is interpolated. A data symbol stored in $y_3$ of Equation (1-c) corresponds to index (6, 3), and a channel value of the data symbol corresponding to index (5, 4) is updated into memory position $y_2$. Then, a channel value of the data symbol corresponding to index (4, 5) is updated into memory position $y_1$ by (b). With regard to this, $y_2'$, to be presently updated by Equation (1-c), is used as previously updated $y_2$ in Equation (1-b). The above-mentioned exemplary embodiment has been described based on the pilot structure of the DVB-H system in FIG. 2, for the convenience of explanation only. That is, the channel estimation procedure of the present invention is not limited to the DVB-H system.

(3) Calculated incremental values are updated into the Δ memory 810 according to the following Equations (1d) through (1-f):

$$(d)\Delta_0 = (chEst_0 - y_0)/4, \text{ (pilot position of a present OFDM symbol)} \quad (1\text{-d})$$

$$(e)\Delta_1 = (chEst_0 - (y_3 + \Delta_3))/3, \text{ (pilot position of a present OFDM symbol+1)} \quad (1\text{-e})$$

$$(f)\Delta_1 = (chEst_0 - (y_3 + \Delta_3))/3, \text{ (pilot position of a present OFDM symbol+2)} \quad (1\text{-f})$$

In Equations (1-d) through (1-f), $chEst_0$ denotes the pilot position of a present OFDM symbol, $\Delta_0$ denotes an incremental value for interpolation in the time axis, $\Delta_1$ and $\Delta_3$ denote incremental values for diagonal interpolation, and $\Delta_3$ denotes an incremental value along the time axis at the subcarrier corresponding to the pilot position of a present OFDM symbol+3. As stated above, an example thereof is represented in FIG. 6.

Referring to FIG. 6, Equation (1-d) is utilized to calculate an incremental value between respective symbols by evaluating a difference value between the pilot symbol (3, 6) corresponding to $chEst_0$ and the pilot symbol (3, 2) corresponding to $y_0$ and dividing the difference value by 4 based on the number of symbols existing on the connecting line connecting the two pilot symbols. Equations (−1-e and (1-f) have the same value, calculated by evaluating a difference value between the pilot symbol (3, 6) corresponding to $chEst_0$ and the pilot symbol (6, 3) corresponding to $y_3$ and dividing the difference value by 3 based on the number of symbols existing on the connecting line connecting the two pilot symbols. In Equation (1-e) and (1-f), the term expressed by $(y_3 + \Delta_3)$ is the pilot symbol corresponding to index (6, 3). In other words, Equation (1-d) is a part for calculating an incremental value for interpolation in the time axis, and Equation (1-e) and Equation (1-f) are parts for calculating incremental values for diagonal interpolation allowing for simultaneous interpolation in the time and frequency axes. Explaining the above-mentioned operations Equation (1-d) to Equation (1-f), the linear interpolator calculates $\Delta_0$ at the position of a present OFDM symbol (operation (1-d)), and calculates $\Delta_1$ and $\Delta_2$ at a subcarrier position spaced apart therefrom by one index or two indexes (operations (1-e) and (1-f)). A channel value of they memory 830 and an incremental value of the Δmemory 810, stored in a subcarrier position spaced apart by 3 indexes, are used in calculating $\Delta_1$ and $\Delta_2$, as mentioned above.

(4) Interpolation in the frequency axis is conducted using the y memory 830.

In the y memory 830, sections used for interpolation in the frequency axis are sections corresponding to multiples of 3, a section corresponding to the pilot position of a present OFDM symbol plus four of the subcarrier, and a section corresponding to the pilot position of a present OFDM symbol plus eight of the subcarrier. Thereafter, if the receiver in FIG. 4 completes the above-mentioned operations (1) to (4), it performs channel compensation by using a result value obtained from interpolation in the frequency axis.

Figure 9:
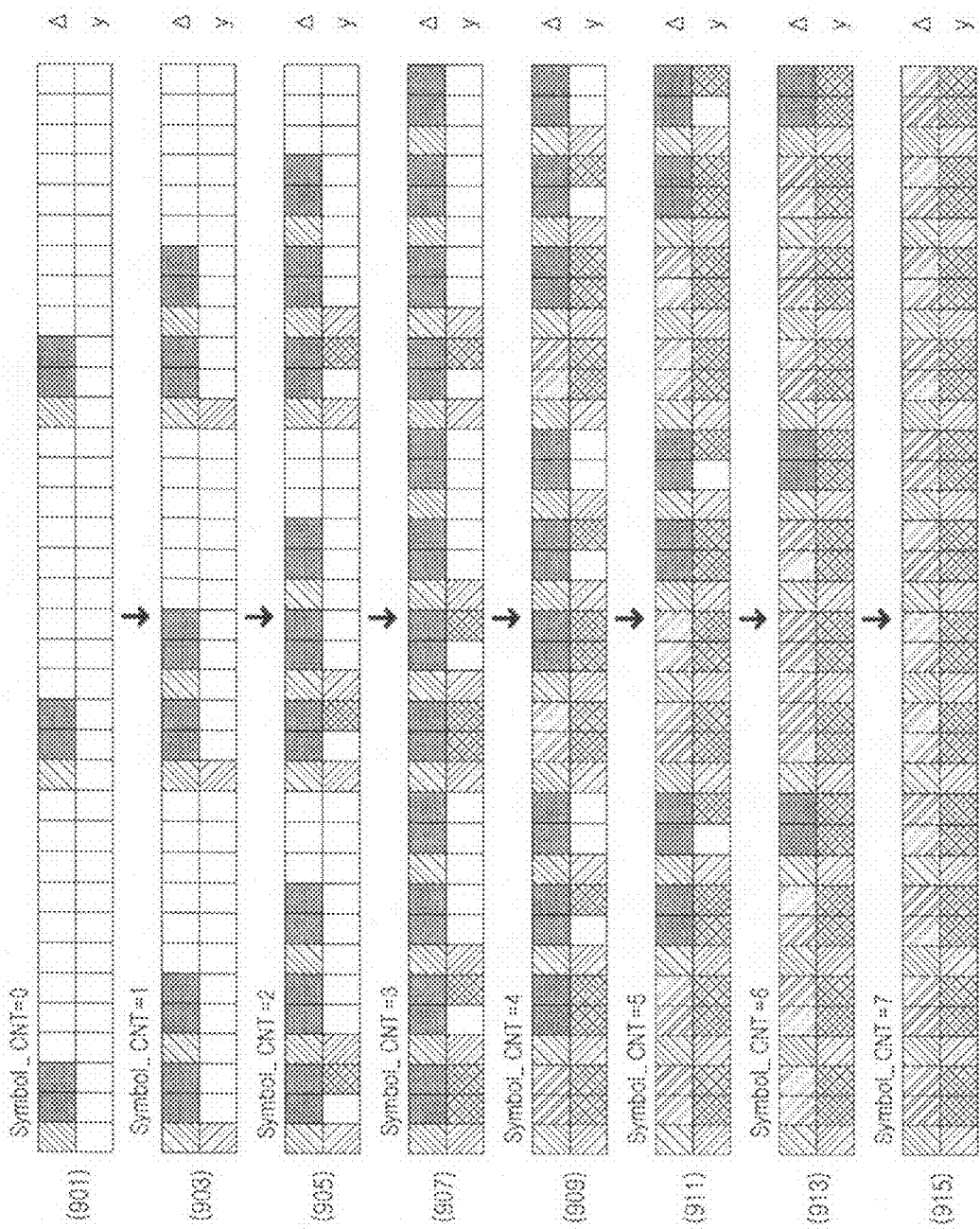
FIG. 9 is a view illustrating how the state of a memory storing channel information changes according to time when a linear interpolation method of the present invention is applied.

Steps 901 to 915 in FIG. 9 illustrate how the state of a memory storing channel information changes according to time when the linear interpolation method of FIG. 6 is applied. In FIG. 9, Step 901 represents a channel estimation procedure for the $0^{th}$ OFDM symbol. After a pilot channel is estimated by using a pilot symbol of the $0^{th}$ OFDM symbol, the operations of Equations (1-a) to (1-f4) are carried out. At this time, since the initial memory state is 0, all section of the y memory are filed with 0, and the Δ memory stores values calculated by the estimated pilot channel value. Step 903 represents a channel estimation procedure for the $1^{st}$ OFDM symbol. The operations of Equations (1-a) to (1-f) are carried out using an estimated pilot channel of the $1^{st}$ OFDM symbol. At this time, since some sections of the Δ memory are filled with data, information of the y memory and the Δ memory are updated using these data and channel information estimated at a present symbol. Such a procedure is repeated until channel information of the last OFDM symbol is obtained.

Figure 10:
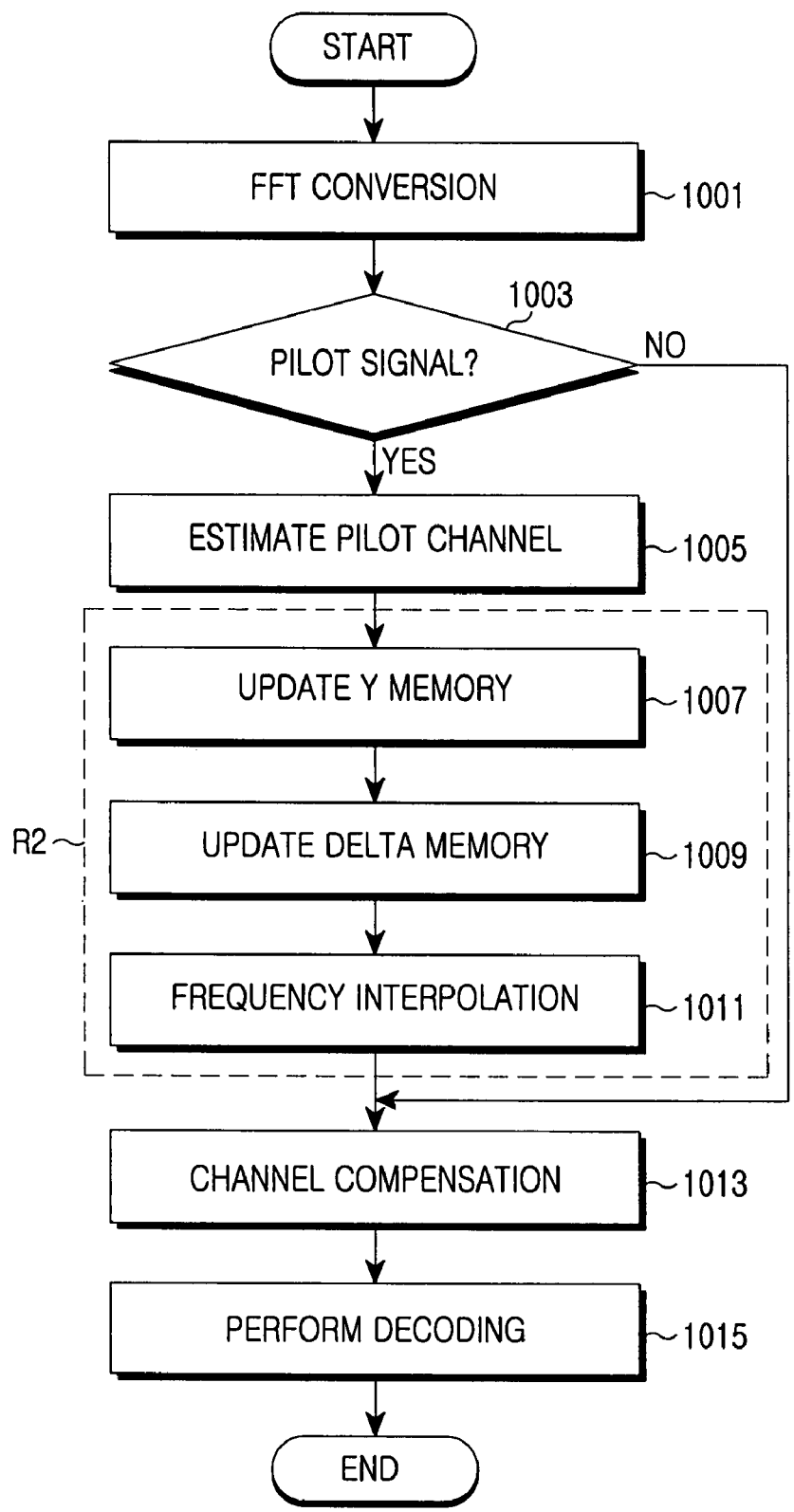
FIG. 10 is a flowchart illustrating a linear interpolation method applied in channel estimation in accordance with the present invention.

FIG. 10 is a flowchart illustrating a linear interpolation method applied in channel estimation according to the present invention. In FIG. 10, operations included in the block designated by reference numeral "R2" are performed in the linear interpolator 409b illustrated in FIG. 4. The operations designated by "R2" illustrates in detail Step 513 of conducting diagonal interpolation to estimate data channels in FIG. 5.

First, in Step 1001, radio signals are received, and the FFT 407 performs a demodulation operation for converting the time-domain signals into frequency-domain signals. In Step 1003, the pilot channel estimator 409a determines whether it detects pilot signals from among signals output from the FFT 407. When the pilot channel estimator 409a detects pilot signals, it estimates pilot channels in Step 1005.

In Steps 1007 and 1009, the linear interpolator 409b updates information of the y memory and the Δ memory by using the estimated pilot channel information, for example, as described in regard to FIG. 8. In Step 1011, the linear interpolator 409b conducts diagonal interpolation according to the present invention, which allows for simultaneous interpolation in the time and frequency axes, by using the updated memory information, and conducts interpolation in the frequency axis to estimate channels corresponding to data. In Step 1013, the channel compensator 411 compensates for channels of the received signals by using the estimated channels. Finally, in Step 1015, the decoder 413 decodes the received signals, the channels of which have been compensated, into original signals. If in Step 1003 pilot signals are not detected from among the signals output from the FFT 407, the operations in Steps 1005 and 1011 are omitted, and the linear interpolation method goes to Step 1013 to perform only the channel compensation operation.

When interpolation in the time axis and interpolation in the frequency axis are separately conducted as usual, a memory capacity of five times the number of pilot positions times the data format is required. However, when the inventive two-dimensional diagonal interpolation allowing for simultaneous interpolation in the time and frequency axes is conducted, only a memory capacity of two times the number of pilot positions and diagonal interpolation positions times the data format is required. Thus, if the inventive linear interpolation method is used, it is possible to use a small memory capacity in channel estimation, as compared with the conventional interpolation method.

Figure 11:
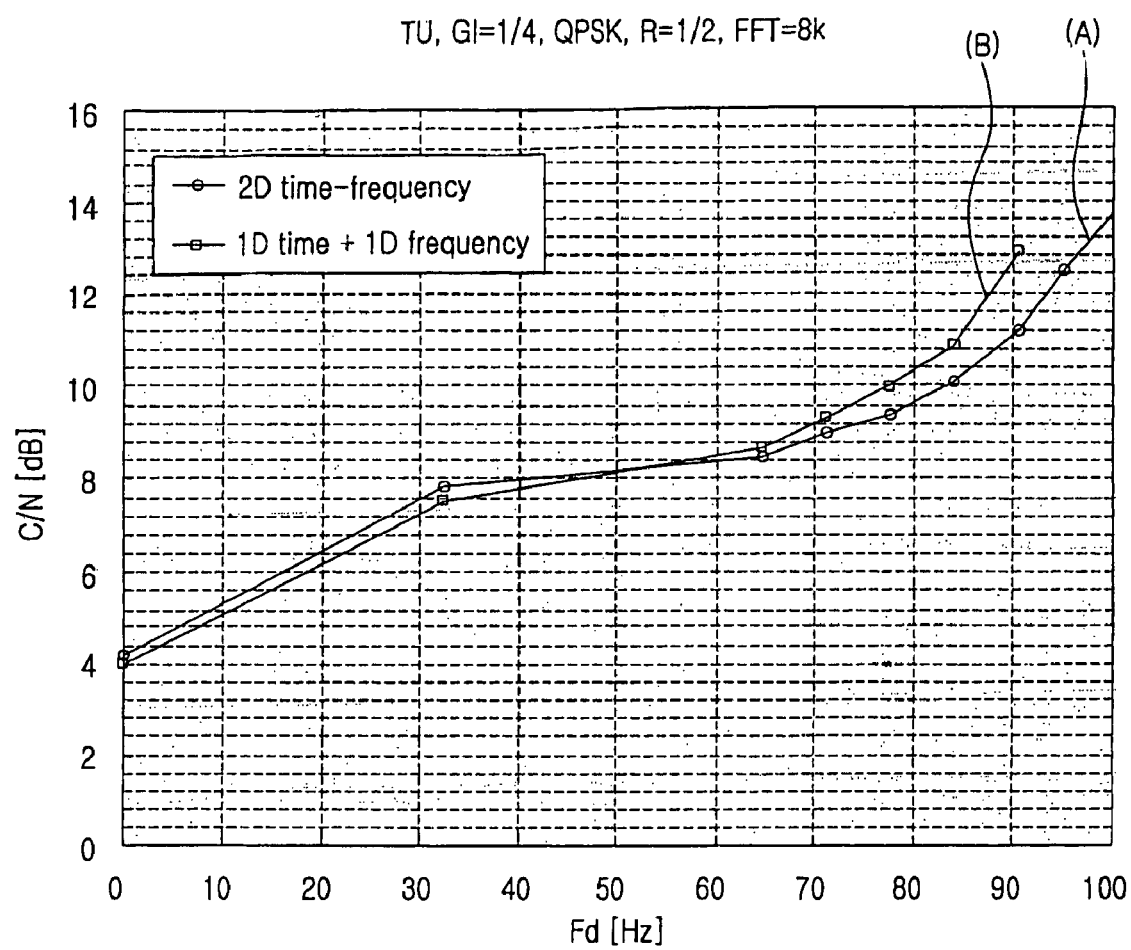
FIG. 11 is a graph illustrating a performance test result of a receiver in channel estimation in accordance with the present invention.

As seen from a simulation result illustrated in FIG. 11, the inventive channel estimation method improves the performance of a receiver in a high-speed wireless environment. In FIG. 11, reference numeral (A) indicates the resultant curve when applying a channel estimation method using the inventive two-dimensional diagonal interpolation, and reference numeral (B) indicates the resultant curve when applying a conventional channel estimation method where interpolation in the time axis and interpolation in the frequency axis are separately conducted. In FIG. 11, it can be noted that, at a C/N of 13 dB, a speed at which the same BER (Bit Error Rate) can be obtained is 93 Hz in the case of the channel estimation scheme proposed in the present invention whereas 88 Hz in the case of the convention channel estimation scheme.

As described above, according to the present invention, the memory capacity required for a receiver can be reduced using a channel estimation method in which interpolation in the time axis and interpolation in the frequency axis are simultaneously conducted.

Also, the present invention can provide a channel estimation scheme which further improves the performance of a receiver in a wireless environment where the receiver moves at high speed.

While the invention has been shown and described with reference to certain exemplary embodiments thereof, it will be understood by those skilled in the art that various changes in form and details may be made therein without departing from the spirit and scope of the invention, as defined by the appended claims.

What is claimed is:

1. A channel estimation method in a receiver of an Orthogonal Frequency Division Multiplexing (OFDM) system, the channel estimation method comprising the steps of:
   estimating, by a pilot channel estimator, first and second pilot channels at a first pilot allocation subcarrier in a channel estimation metric;
   if the first and second pilot channels are estimated, searching for a third pilot channel that is estimated within a time interval, at which two pilot symbols carried by the first pilot allocation subcarrier have been transmitted, from among pilot channels estimated from a second pilot allocation subcarrier adjacent to the first pilot allocation subcarrier; and
   estimating channels carrying data symbols included in a triangle formed by three estimated pilot channels in the channel estimation metric.

2. The channel estimation method as claimed in claim 1, wherein estimating channels carrying data symbols comprises:
   estimating channels of data, which exist on connecting lines between the three estimated pilot channels, on the channel estimation metric by linear-interpolating information on the three estimated pilot channels; and
   estimating channels of data, which exist within the triangle formed by the connecting lines between the three estimated pilot channels, on the channel estimation metric by linear-interpolating channel estimation information of data on the connecting lines.

3. The channel estimation method as claimed in claim 2, wherein estimating channels of data comprises selectively estimating the channels of the data according to whether data exists on the connecting lines.

4. The channel estimation method as claimed in claim 2, wherein estimating channels of data existing on the connecting lines between the three estimated pilot channels comprises estimating the channels of the data existing on the connecting line between the first and second pilot channels, and then estimating the channels of the data existing on a connecting line between the third pilot channel and one of the first and second pilot channels.

5. The channel estimation method as claimed in claim 2, wherein estimating channels of data existing within the triangle comprises conducting linear interpolation with respect to a time axis or a frequency axis.

6. A channel estimation method in a receiver of an Orthogonal Frequency Division Multiplexing (OFDM) system, the channel estimation method comprising the steps of:
  estimating, by a pilot channel estimator, pilot channels carrying pilot symbols;
  if one pilot symbol carried by a pilot allocation subcarrier is received and a pilot channel of the pilot allocation subcarrier is estimated, searching for pilot channels of two other pilot symbols, which are connected with the one pilot symbol to form a minimum triangle in a channel estimation metric, from among pilot symbols previously carried by other pilot allocation subcarriers; and
  estimating channels carrying data symbols included in the triangle formed by three estimated pilot channels in the channel estimation metric.

7. The channel estimation method as claimed in claim 6, wherein estimating channels carrying data symbols included in the triangle comprises:
  estimating channels of data, which exist on connecting lines between the three estimated pilot channels, on the channel estimation metric by linear-interpolating information on the three estimated pilot channels; and
  estimating channels of data, which exist within the triangle formed by the connecting lines between the three estimated pilot channels, on the channel estimation metric by linear-interpolating channel estimation information of data on the connecting lines.

8. The channel estimation method as claimed in claim 7, wherein estimating channels of data existing on the connecting lines between the three estimated pilot channels comprises selectively estimating the channels of the data according to whether data exists on the connecting lines.

9. The channel estimation method as claimed in claim 7, wherein estimating channels of data existing within the triangle comprises conducting linear interpolation with respect to a time axis or a frequency axis.

10. A channel estimation apparatus provided in a receiver of an Orthogonal Frequency Division Multiplexing (OFDM) system, the channel estimation apparatus comprising:
  a pilot channel estimator for estimating first and second pilot channels at a first pilot allocation subcarrier in a channel estimation metric; and
  a linear interpolator which, if the first and second pilot channels are estimated, searches for a third pilot channel that is estimated within a time interval, at which two pilot symbols carried by the first pilot allocation subcarrier have been transmitted, from among pilot channels estimated from a second pilot allocation subcarrier adjacent to the first pilot allocation subcarrier, and estimates channels carrying data symbols included in a triangle formed by three estimated pilot channels in the channel estimation metric.

11. The channel estimation apparatus as claimed in claim 10, wherein the linear interpolator estimates channels of data, which exist on connecting lines between the three estimated pilot channels, on the channel estimation metric by linear-interpolating information on the three estimated pilot channels, and estimates channels of data, which exist within the triangle formed by the connecting lines between the three estimated pilot channels, on the channel estimation metric by linear-interpolating channel estimation information of data on the connecting lines.

12. The channel estimation apparatus as claimed in claim 11, wherein the linear interpolator estimates the channels of the data existing on a connecting line between the first and second pilot channels, and then estimates the channels of the data existing on a connecting line between the third pilot channel and one of the first and second pilot channels.

13. The channel estimation apparatus as claimed in claim 10, wherein the linear interpolator comprises:
  a first memory for storing estimated channel values of pilot signals and data signals in defined positions; and
  a second memory for storing incremental values for next channel estimations in defined positions,
  wherein the linear interpolator conducts interpolation in a frequency axis by using the estimated channel values stored in the first memory.

14. The channel estimation apparatus as claimed in claim 10, further comprising:
  a Radio Frequency end for receiving and processing radio signals including the pilot symbols;
  a fast Fourier transformer for converting the radio signals into frequency-domain signals and outputting the converted radio signals to the pilot channel estimator;
  a channel compensator for compensating for signals of the estimated channels by using channel information output from the linear interpolator; and
  a decoder for decoding received signals of the estimated channels into original signals.

15. A channel estimation apparatus provided in a receiver of an Orthogonal Frequency Division Multiplexing (OFDM) system, the channel estimation apparatus comprising:
  a pilot channel estimator for estimating pilot channels carrying pilot symbols; and
  a linear interpolator which, if one pilot symbol carried by a pilot allocation subcarrier is received and a pilot channel of the pilot allocation subcarrier is estimated, searches for pilot channels of two other pilot symbols, which are connected with the one pilot symbol to form a minimum triangle in a channel estimation metric, from among pilot symbols previously carried by other pilot allocation subcarriers, and estimates channels carrying data symbols included in the triangle formed by three estimated pilot channels in the channel estimation metric.

16. The channel estimation apparatus as claimed in claim 15, wherein the linear interpolator estimates channels of data, which exist on connecting lines between the three estimated pilot channels, on the channel estimation metric by linear-interpolating information on the three estimated pilot channels, and estimates channels of data, which exist within the triangle formed by the connecting lines between the three estimated pilot channels, on the channel estimation metric by linear-interpolating channel estimation information of data on the connecting lines.

17. The channel estimation apparatus as claimed in claim 15, wherein the linear interpolator comprises:
  a first memory for storing estimated channel values of pilot signals and data signals in defined positions; and a second memory for storing incremental values for next channel estimations in defined positions, wherein the linear interpolator conducts interpolation in a frequency axis by using the estimated channel values stored in the first memory.

18. The channel estimation apparatus as claimed in claim 15, further comprising:

a Radio Frequency end for receiving and processing radio signals including the pilot symbols;

a fast Fourier transformer for converting the radio signals into frequency-domain signals and outputting the converted radio signals to the pilot channel estimator;

a channel compensator for compensating for signals of the estimated channels by using channel information output from the linear interpolator; and a decoder for decoding received signals of the estimated channels into original signals.

* * * * *